United States Patent [19]

Herr et al.

[11] 4,283,647

[45] Aug. 11, 1981

[54] ANNULAR SEGMENT PERMANENT MAGNET SINGLE AIR GAP ELECTRIC MOTOR

[75] Inventors: John A. Herr, Garwood; Wolfgang Jaffe, Roselle Park, both of N.J.

[73] Assignee: The Singer Company, Stamford, Conn.

[21] Appl. No.: 70,770

[22] Filed: Aug. 30, 1979

[51] Int. Cl.³ .......................................... H02K 21/28
[52] U.S. Cl. ................................................. 310/154
[58] Field of Search .......................... 310/154, 266, 43

[56] References Cited

U.S. PATENT DOCUMENTS

| 3,102,964 | 9/1963 | Bennett et al. | 310/266 X |
| 3,335,309 | 8/1967 | Hansen | 310/266 |
| 3,553,509 | 1/1971 | Schellekens | 310/154 |
| 3,891,876 | 6/1975 | Herr et al. | 310/154 X |
| 3,906,268 | 9/1975 | de Graffenried | 310/266 X |
| 4,181,866 | 1/1980 | Morisawa | 310/154 |

*Primary Examiner*—Donovan F. Duggan
*Attorney, Agent, or Firm*—David L. Davis; Robert E. Smith; Edward L. Bell

[57] ABSTRACT

A single air gap permanent magnet electric motor is provided with field magnets formed as thick annular segments concentric with the axis of rotation of a solid non-magnetic cylindrical armature. The field magnets are magnetized radially to the axis and have oppositely polarized pole faces facing the axis. The ratio of the thickness to the inner diameter of the annular segments is maintained within a defined range to provide for a high magnetic flux density across the single air gap.

4 Claims, 3 Drawing Figures

U.S. Patent     Aug. 11, 1981     4,283,647
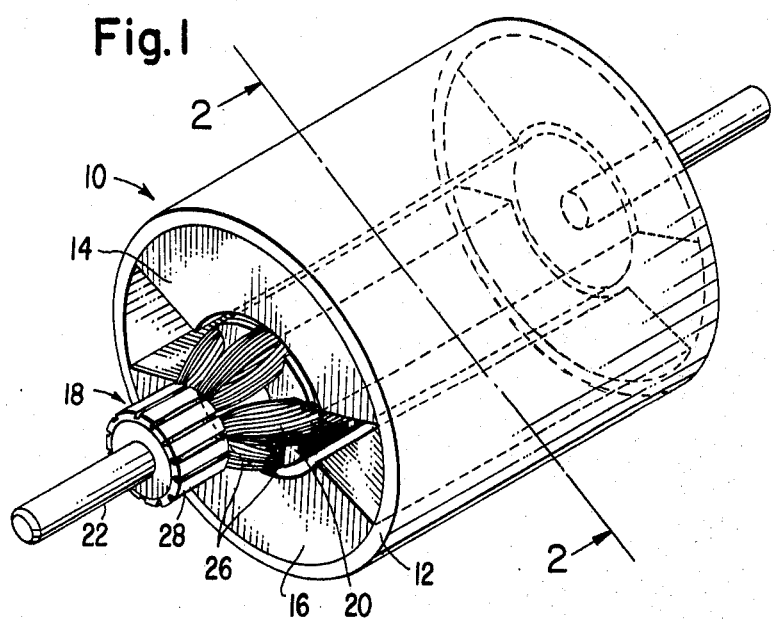
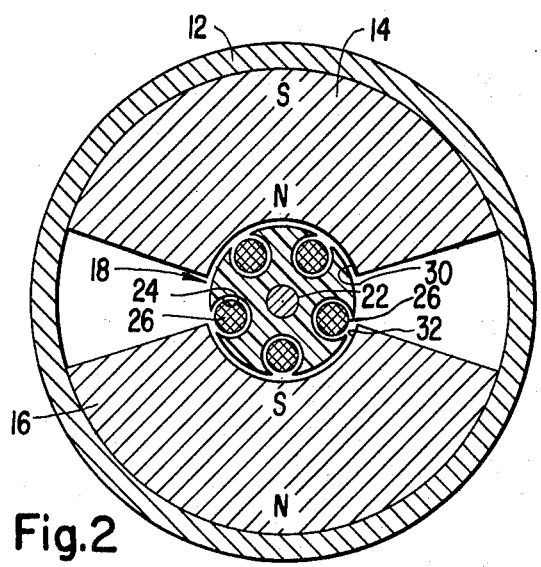
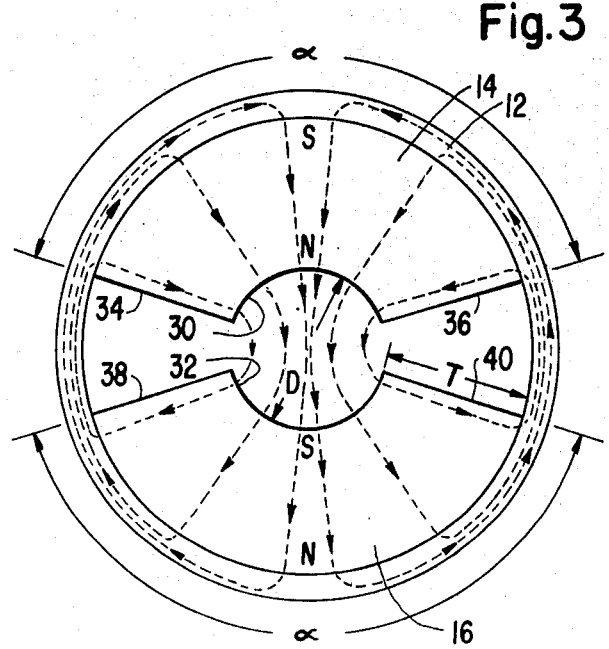

ANNULAR SEGMENT PERMANENT MAGNET SINGLE AIR GAP ELECTRIC MOTOR

BACKGROUND OF THE INVENTION

This invention relates to electric motors and, more particularly, to permanent magnet single air gap electric motors.

In our prior U.S. Pat. No. 3,891,876, issued June 24, 1975, there is disclosed a single air gap permanent magnet electric motor having a single solid non-magnetic armature with commutated windings thereon mounted for rotation centrally in a single air gap formed between opposed pairs of permanent magnets having oppositely polarized flat or convex poles facing the armature. Sufficient air gap flux is provided through the use of rare earth alloy magnets. Although this prior disclosed motor has superior operational characteristics over those of conventional permanent magnet motors, the use of rare earth alloy magnets substantially increases the cost of such a motor. It would therefore be desirable to utilize low cost magnets such as ceramic magnets. However, the magnetic flux density provided by ceramic magnets of conventional configuration is not great enough for use in a single air gap permanent magnet motor.

It is therefore an object of this invention to provide an arrangement whereby ceramic magnets may be utilized to provide adequate flux density for use in a single air gap permanent magnet motor.

SUMMARY OF THE INVENTION

The foregoing and additional objects are attained in accordance with the principles of this invention by providing a permanent magnet single air gap electric motor wherein the permanent magnets are formed as substantially equal size annular segments concentric with the axis of rotation of the motor armature. The magnets are magnetized in a direction extending radially with respect to the axis and are constructed with a ratio of thickness to inner diameter within a defined range so that the magnetic flux density is greatly concentrated.

BRIEF DESCRIPTON OF THE DRAWING

The foregoing will be more readily apparent upon reading the following description in conjunction with the drawings wherein:

FIG. 1 is a perspective view of a pertinent portion of a motor constructed in accordance with the principles of this invention;

FIG. 2 is a cross sectional view taken along the line 2—2 of FIG. 1; and

FIG. 3 diagrammetrically illustrates the magnetic flux paths within the motor of FIGS. 1 and 2.

DETAILED DESCRIPTION

Referring now to the drawings wherein like elements in different figures thereof have the same reference character applied thereto, a motor designated generally by the reference numeral 10 constructed in accordance with the principles of this invention generally comprises a cylindrical housing 12 constructed of a ferromagnetic material. Secured to the inner surface of the housing 12, as by epoxy cement or the like, is a pair of field magnets 14 and 16, to be described in more detail hereinafter.

Located coaxially within the cylindrical housing 12 is a cylindrical armature 18. The armature 18 is of non-magnetic material and preferably includes a molded plastic winding frame member 20 having a stainless steel rotor shaft 22 molded integrally therein. The winding frame member 20 is formed with longitudinal slots 24 in which are located windings 26 connected, in a conventional manner, to a commutator 28 mounted on the shaft 22. Although not shown in the drawings, the ends of the housing 12 are adapted to be enclosed by suitable end caps having suitable bearing members in which the shaft 22 is journalled for rotation. Additionally, the end cap surrounding the commutator 28 contains a conventional contact brush assembly having provision for electrical connection thereto to control the rotation of the motor 10 from an external electric power source, in a manner well known in the art.

In accordance with the principles of this invention a high flux density across the single air gap within which is positioned the armature 18 is achieved without the use of rare earth alloy magnets by shaping the field magnets 14 and 16 as thick annular segments wherein the inner surfaces 30 and 32 of the magnets 14 and 16, respectively, are poles of opposite polarities, as shown by the letters N and S. High energy ceramic magnets, which are of reasonable cost, may then be utilized. The annular segment shape of the magnets 14 and 16 causes the magnetic flux to be concentrated across the air gap, as illustrated in FIG. 3 wherein the broken lines depict the flux paths. As shown in FIG. 3, the flux paths originate in the magnets 14 and 16 and utilize the air gap between the magnets 14 and 16 and the ferromagnetic material of the housing 12 as the return paths. The magnets 14 and 16 are initially magnetized by placing them in radially oriented magnetic fields. In this way, the flux density through the magnets 14 and 16 varies substantially inversely to the distance from the central axis thereof, the total flux at any radial distance from the axis being a constant. Thus, at the inner surfaces 30 and 32, the flux density is highly concentrated with respect to that at the surfaces in contact with the housing 12. The edges 34, 36, 38 and 40 of the magnets 14 and 16 are substantially radially oriented with respect to the central axis to minimize edge leakage effects.

To provide the desired flux density concentration across the air gap, the annular segment magnets 14 and 16 must have a substantial thickness T with respect to their inner diameter D. In particular, the thickness T and the inner diameter D should obey the relationship $$0.7D < T < 1.3D.$$

Additionally, it has been found that the arc length $\alpha$ transcended by the annular segments forming magnets 14 and 16 should be approximately 145°.

Accordingly, there has been disclosed an improved single air gap permanent magnet electric motor. It is understood that the above-described embodiment is merely illustrative of the application of the principles of this invention. Numerous other embodiments may be devised by those skilled the art without departing from the spirit and scope of this invention, as defined by the appended claims.

We claim:

1. In an electric motor having a solid non-magnetic cylindrical armature with commutated windings thereon, and means rotationally mounting said armature about the cylindrical axis thereof radially within a single air gap formed by peripheral permanent magnets having oppositely polarized pole faces facing the axis of said armature, the improvement wherein said permanent magnets are formed as substantially equal size annular segments concentric with said axis and magnetized radially to said axis, each of said annular segments having an inner diameter D and a thickness T obeying the relationship $0.7D < T < 1.3D.$ 2. The improvement according to claim 1 wherein the edges of said permanent magnets are substantially radially oriented with respect to said axis.

3. The improvement according to claim 1 wherein said permanent magnets are made from high energy ceramic magnets.

4. The improvement according to claim 1 wherein each of said annular segments extends over an arc length of approximately 145°.

* * * * *